United States Patent
Suzuki

(10) Patent No.: US 7,515,897 B2
(45) Date of Patent: Apr. 7, 2009

(54) COMMUNICATION APPARATUS

(75) Inventor: Tomoyuki Suzuki, Machida (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 706 days.

(21) Appl. No.: 10/946,527

(22) Filed: Sep. 20, 2004

(65) Prior Publication Data
US 2005/0143046 A1 Jun. 30, 2005

(30) Foreign Application Priority Data
Dec. 19, 2003 (JP) ............... 2003-422901

(51) Int. Cl.
*H04B 1/16* (2006.01)
(52) U.S. Cl. .......... 455/343.2; 455/11.1; 455/41.1; 455/410; 455/456.1; 370/244; 370/338; 370/349; 368/10; 368/47
(58) Field of Classification Search .......... 455/343.2
See application file for complete search history.

(56) References Cited

U.S. PATENT DOCUMENTS

| | | | | |
|---|---|---|---|---|
| 6,192,251 | B1* | 2/2001 | Jyogataki et al. | 455/466 |
| 6,339,706 | B1* | 1/2002 | Tillgren et al. | 455/419 |
| 6,563,427 | B2* | 5/2003 | Bero et al. | 340/573.1 |
| 6,745,038 | B2* | 6/2004 | Callaway et al. | 455/456.1 |
| 6,760,317 | B1* | 7/2004 | Honkanen et al. | 370/329 |
| 6,791,473 | B2* | 9/2004 | Kibria et al. | 340/932.2 |
| 6,795,421 | B1* | 9/2004 | Heinonen et al. | 370/338 |
| 6,885,656 | B2* | 4/2005 | Sashihara | 370/350 |
| 6,930,958 | B2* | 8/2005 | Goergen | 368/10 |
| 6,954,438 | B2* | 10/2005 | Morley et al. | 370/278 |
| 7,039,173 | B2* | 5/2006 | Tuunanen | 379/221.12 |
| 7,092,368 | B2* | 8/2006 | Kumar et al. | 370/328 |
| 7,126,935 | B1* | 10/2006 | Brown et al. | 370/349 |
| 7,142,814 | B2* | 11/2006 | Nassimi | 455/41.2 |
| 7,164,887 | B2* | 1/2007 | Tanada et al. | 455/41.2 |
| 7,193,991 | B2* | 3/2007 | Melpignano et al. | 370/352 |
| 7,212,786 | B2* | 5/2007 | Kojima et al. | 455/41.2 |
| 7,269,657 | B1* | 9/2007 | Alexander et al. | 709/229 |
| 2001/0002912 | A1* | 6/2001 | Tony et al. | 370/487 |
| 2001/0029166 | A1* | 10/2001 | Rune et al. | 455/41 |

(Continued)

FOREIGN PATENT DOCUMENTS

EP    1 324 540 A2    7/2003

(Continued)

OTHER PUBLICATIONS

RAD, "What is Blue Tooth?", RAD data communication, 2000, www.pulsewan.com, 12 pages.*

(Continued)

*Primary Examiner*—Duc Nguyen
*Assistant Examiner*—Hai V Nguyen
(74) *Attorney, Agent, or Firm*—Frishauf, Holtz, Goodman & Chick, P.C.

(57) ABSTRACT

If a control section fails to detect a connectable device by Inquiry/Page_Scan before an OFF timer times out, the control section halts the Inquiry/Page_Scan. The control section keeps this state until time-out of an ON timer. Upon time-out of the ON timer, the control section starts Inquiry/Page. The control section issues a request for a role switch to the connectable device detected by Inquiry/Page. Upon acceptance of the request, the control section effects a master/slave role switch.

10 Claims, 3 Drawing Sheets

U.S. PATENT DOCUMENTS

| | | | |
|---|---|---|---|
| 2002/0031100 A1* | 3/2002 | Sashihara | 370/294 |
| 2002/0044549 A1* | 4/2002 | Johansson et al. | 370/386 |
| 2002/0059416 A1* | 5/2002 | Tuunanen | 709/223 |
| 2002/0145980 A1* | 10/2002 | Morley et al. | 370/244 |
| 2002/0159401 A1* | 10/2002 | Boger | 370/294 |
| 2002/0168943 A1* | 11/2002 | Callaway et al. | 455/67.1 |
| 2002/0172263 A1* | 11/2002 | Kindred et al. | 375/132 |
| 2003/0003921 A1* | 1/2003 | Laakso | 455/453 |
| 2003/0008612 A1* | 1/2003 | Andreason | 455/11.1 |
| 2003/0054767 A1* | 3/2003 | Mandhyan et al. | 455/41 |
| 2003/0124979 A1 | 7/2003 | Tanada et al. | |
| 2003/0174685 A1* | 9/2003 | Hasebe | 370/338 |
| 2003/0179107 A1* | 9/2003 | Kibria et al. | 340/932.2 |
| 2003/0185104 A1* | 10/2003 | Goergen | 368/47 |
| 2003/0186715 A1* | 10/2003 | McGowan | 455/509 |
| 2004/0009748 A1* | 1/2004 | Heinonen et al. | 455/41.2 |
| 2004/0047319 A1* | 3/2004 | Elg | 370/338 |
| 2004/0147267 A1* | 7/2004 | Hill et al. | 455/456.1 |
| 2004/0152417 A1* | 8/2004 | Kim et al. | 455/41.2 |
| 2004/0165562 A1* | 8/2004 | Elaoud et al. | 370/338 |
| 2004/0203356 A1* | 10/2004 | Takatori et al. | 455/41.1 |
| 2004/0246932 A1* | 12/2004 | Fischer | 370/338 |
| 2004/0258033 A1* | 12/2004 | Heinonen et al. | 370/338 |
| 2004/0266494 A1* | 12/2004 | Ruuska et al. | 455/574 |
| 2005/0002407 A1* | 1/2005 | Shaheen et al. | 370/401 |
| 2005/0005093 A1* | 1/2005 | Bartels et al. | 713/150 |
| 2005/0055270 A1* | 3/2005 | Broe | 705/14 |
| 2005/0187882 A1* | 8/2005 | Sovio et al. | 705/64 |
| 2006/0012476 A1* | 1/2006 | Markhovsky et al. | 340/539.32 |
| 2006/0025161 A1* | 2/2006 | Funato et al. | 455/458 |
| 2006/0034231 A1* | 2/2006 | Tailor | 370/338 |
| 2006/0089119 A1* | 4/2006 | Lipasti et al. | 455/410 |
| 2008/0019344 A1* | 1/2008 | Palm et al. | 370/338 |

FOREIGN PATENT DOCUMENTS

| | | |
|---|---|---|
| JP | 2003-37545 A | 2/2003 |
| WO | WO 02/089391 A1 | 11/2002 |

OTHER PUBLICATIONS

Abhyankar et al., "On the Application of Traffic Engineering over Bluetooth Ad Hoc Networks", MSWiM'03, ACM 2003, pp. 116-123.*

"Specification of Bluetooth System, Wireless Connections Made Easy, Core, Version 1.1" Specification of the Bluetooth System, XX, XX, vol. 1, Feb. 22, 2001, pp. 1, 92-125, XP002223350.

* cited by examiner

COMMUNICATION APPARATUS

CROSS-REFERENCE TO RELATED APPLICATIONS

This application is based upon and claims the benefit of priority from prior Japanese Patent Application No. 2003-422901, filed Dec. 19, 2003, the entire contents of which are incorporated herein by reference.

BACKGROUND OF THE INVENTION

1. Field of the Invention

The present invention relates to a communication apparatus that is used as a terminal in a communication network, such as a piconet according to Bluetooth technology, wherein one of a plurality of terminals acts as a master and the other(s) as slave(s), thereby executing communication between the terminals.

2. Description of the Related Art

In Bluetooth, in a state in which a connectable device is not found, a standby operation by Inquiry/Page_Scan is executed. If the Inquiry/Page_Scan is always executed, however, a current consumption would increase.

Jpn. Pat. Appln. KOKAI Publication No. 2003-37545, for instance, discloses a technique that is available in order to overcome this drawback. According to this technique of Japanese KOKAI 2003-37545, if an interrupt due to reception of an incoming signal or a key operation does not occur during a predetermined time period, a short-distance wireless function is turned off, thereby reducing power consumption.

The technique of Japanese KOKAI 2003-37545, however, completely disables the short-distance wireless function. In this case, the standby operation is also disabled. Consequently, even if a connectable device is present nearby, this connectable device cannot be detected.

Under the circumstances, there is a demand for a technique that makes it possible to carry out a search for a connectable device, while reducing power consumption that is needed for the search operation.

BRIEF SUMMARY OF THE INVENTION

According to an aspect of the present invention, there is provided a communication apparatus that is used as a terminal in a communication network wherein one of a plurality of terminals acts as a master and the other(s) as slave(s), thereby executing communication between the terminals, comprising: detection means for detecting a signal that is sent from the terminal acting as the master in order to call the communication apparatus; halt means for halting the detection means upon non-detection of the signal during a first time period; transmission means for transmitting the signal; start means for causing the transmission means to start transmission of the signal, upon passage of a second time period from the halt of the detection means; means for issuing a request for a master/slave role switch to the terminal that responds to the signal transmitted from the transmission means; and means for executing the master/slave role switch upon acceptance of the request.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
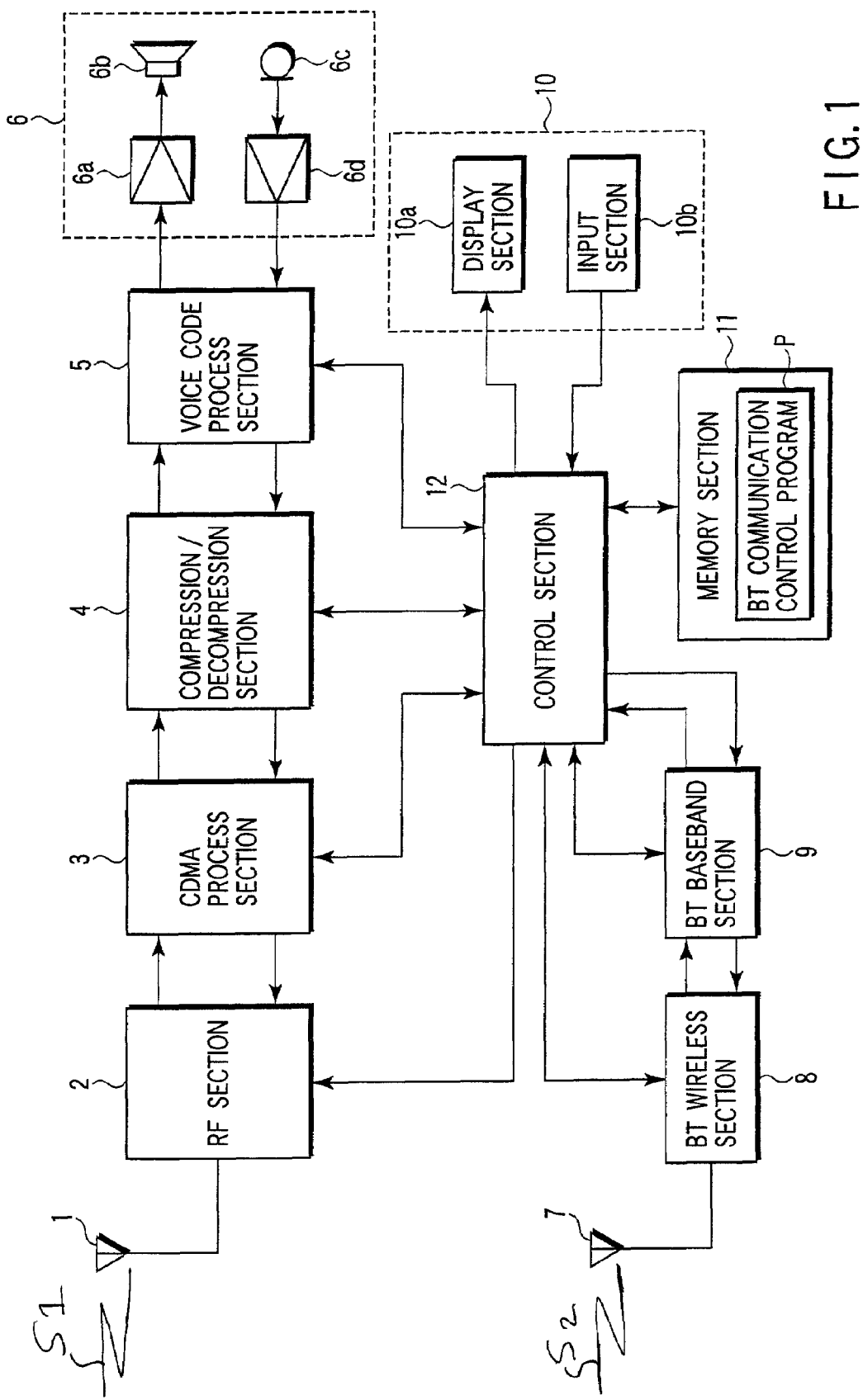
FIG. 1 is a block diagram showing the structure of a wireless communication apparatus according to an embodiment of the present invention.

FIG. 1 is a block diagram showing the structure of a wireless communication apparatus according to the embodiment. This wireless communication apparatus is used as a mobile station of a mobile wireless communication system according to a W-CDMA (Wideband-Code Division Multiple Access) scheme that is stipulated by 3GPP (3rd Generation Partnership Project).

The wireless communication apparatus shown in FIG. 1 includes an antenna 1, an RF section 2, a CDMA process section 3, a compression/decompression section 4, a voice code process section 5, a speech section 6, an antenna 7, a Bluetooth wireless section (hereinafter referred to as "BT wireless section") 8, a Bluetooth baseband section (hereinafter "BT baseband section") 9, a user interface section 10, a memory section 11, and a control section 12. The speech section 6 includes an amplifier 6a, a speaker 6b, a microphone 6c and an amplifier 6d. The user interface section 10 includes a display section 10a and an input section 10b.

A radio signal S1, which is transmitted from a base station (not shown), is received by the antenna 1 and then input to the RF section 2. The RF section 2 extracts a CDMA signal from the output signal that comes from the antenna 1. The CDMA process section 3 extracts reception data from the CDMA signal that is output from the RF section 2. The compression/decompression section 4 extracts voice data from the reception data that is output from the CDMA process section 3. The voice code process section 5 decodes the voice data that is output from the compression/decompression section 4, thereby reproducing a voice signal. The voice signal is amplified by the amplifier 6a, and the amplified voice signal is output from the speaker 6b as voice.

Voice uttered by a user is converted to a voice signal through the microphone 6c. The voice signal is input to the amplifier 6d and amplified to a proper level. The voice code process section 5 encodes the voice signal, which is output from the amplifier 6d, and converts it to voice data. The compression/decompression section 4 compresses the voice data that is output from the voice code process section 5. The CDMA process section 3 generates a CDMA signal including the data output from the compression/decompression section 4. The RF section 2 converts the CDMA signal from the CDMA process section 3 to a radio signal. The radio signal, which is output from the RF section 2, is emitted from the antenna 1 as radio waves.

A radio signal S2, which is transmitted from a communication terminal (not shown) that supports Bluetooth, is received by the antenna 7 and then input to the BT wireless section 8. The BT wireless section 8 extracts a signal according to Bluetooth (hereinafter "BT signal") from the radio signal coming from the antenna 7. The BT baseband section 9 extracts data from the BT signal that is output from the BT wireless section 8. The BT baseband section 9 delivers the extracted data to the control section 12.

The BT baseband section 9 has functions for executing Inquiry/Page and Inquiry/Page_Scan, which are stipulated in the Bluetooth standard. The Inquiry/Page is a process that is executed by the master. The Inquiry/Page process executes transmission of an IQ packet, reception of an FHS packet, and transmission/reception of an ID packet. The Inquiry/Page_Scan is a process that is executed by a slave. The Inquiry/Page_Scan process executes reception of the IQ packet, transmission of the FHS packet, and transmission/reception of the ID packet. The BT baseband section 9 corresponds to (i.e., performs the functions of) the "detection means" and "transmission means" recited in the claims.

The display section 10a includes an LCD (liquid crystal display), an LED (light emitting diode), or the like. The display section 10a displays various information that is to be indicated to the user. The input section 10b includes various keys. The input section 10b inputs the user's instruction through depression of the keys.

The memory section 11 includes, for instance, a ROM, a DRAM (dynamic RAM), an SRAM (static RAM), or a flash memory, depending on cases. The memory section 11 stores an operational program for the control section 12. The memory section 11 stores various data, for instance, various setting information, various reception data or various data produced in the apparatus. The operation program includes a BT communication control program P. The BT communication control program P causes the control section 12 to execute a process, which will be described later. The BT communication control program P may be stored in the memory section 11 at the stage of manufacture of the wireless communication apparatus, or may be stored in the memory section 11 at a proper stage via a communication network or via a communication cable that is connected to a communication interface (not shown).

The control section 12 mainly comprises a microcomputer. The control section 12 realizes operations of the wireless communication apparatus by executing various controls according to software processes based on the operation program stored in the memory section 11. The control section 12 corresponds to (i.e., performs the functions of) the halt means, start means, request means, switch means, stop means and re-start means recited in the claims.

Next, the characteristic operation of the present invention in the wireless communication apparatus with the above structure is described.

Figure 2:
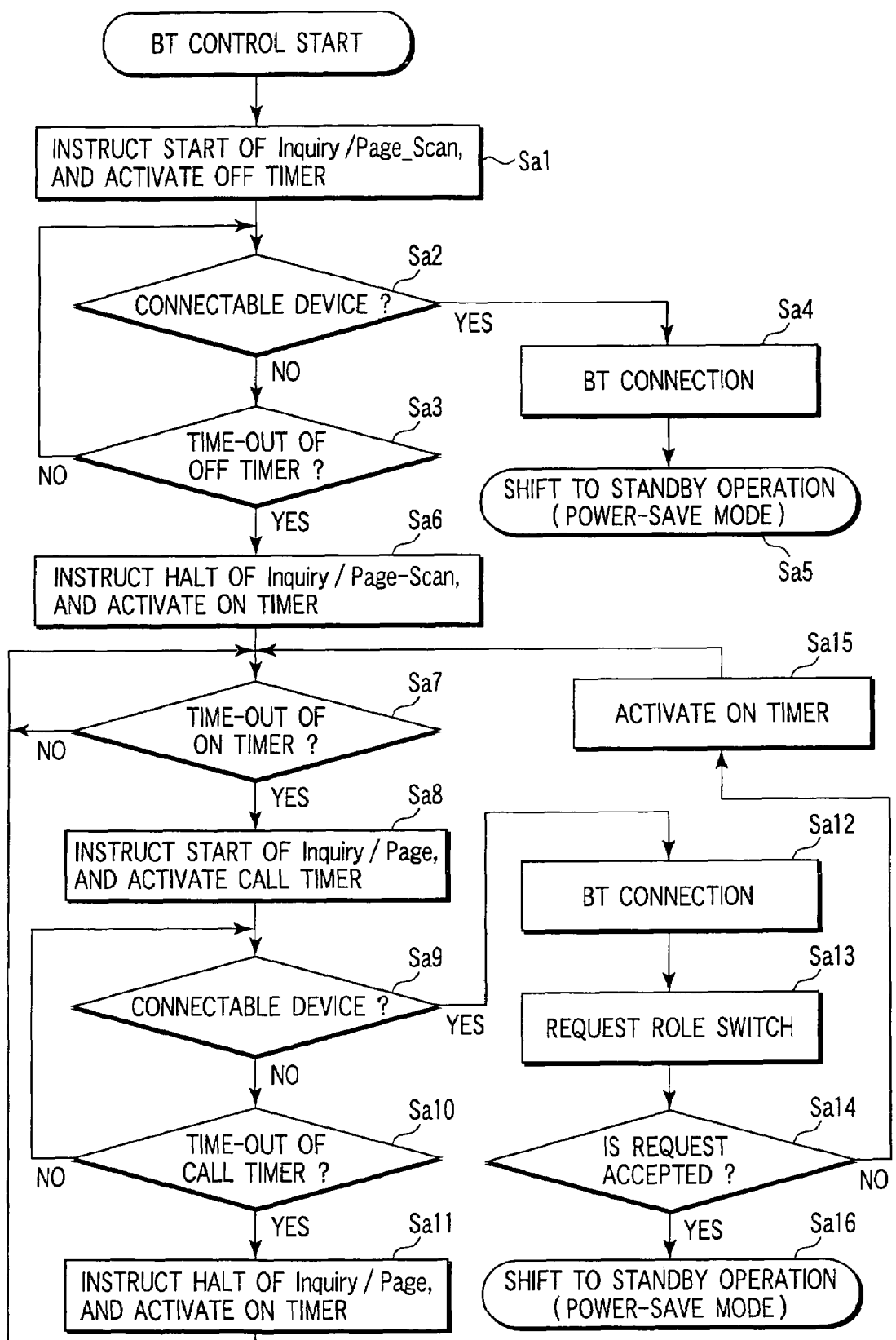
FIG. 2 is a flow chart illustrating procedures of a BT (Bluetooth) control that is executed by a control section in FIG. 1.

When the Bluetooth communication function is enabled by the user, the control section 12 executes a Bluetooth control process (hereinafter "BT control process"), as illustrated in FIG. 2, on the basis of the BT communication control program.

In step Sa1, the control section 12 instructs the BT baseband section 9 to start Inquiry/Page_Scan, and activates an OFF timer. The OFF timer, for example, can be realized by clocking according to another task process by the control section 12. Alternatively, the OFF timer may be realized by using a clock circuit. The OFF timer times out at the end of counting of a predetermined OFF timer value (that is, a first time period).

Upon receiving the instruction from the control section 12, the BT baseband section 9 starts Inquiry/Page_Scan. If a connectable device can be detected by the Inquiry/Page_Scan, the BT baseband section 9 informs the control section 12 of the detection of the connectable device. In this state, the present wireless communication device acts as a slave in the Bluetooth communication.

In step Sa2 and step Sa3, the control section 12 determines whether the connectable device is detected, or stands by for time-out of the OFF timer. If the connectable device is detected prior to time-out of the OFF timer, the control section 12 advances from step Sa2 to step Sa4. In step Sa4, the control section 12 executes Bluetooth connection to the detected connectable device. Then, in step Sa5, the control section 12 passes into a standby operation in a power-save mode that is stipulated in the Bluetooth standard.

If the OFF timer times out without detection of the connectable device, the control section 12 advances from step Sa3 to step Sa6. In step Sa6, the control section 12 instructs the BT baseband section 9 to halt the Inquiry/Page_Scan function, and activates an ON timer. The ON timer, for example, can be realized by clocking according to another task process by the control section 12. Alternatively, the ON timer may be realized by using a clock circuit. The ON timer times out at the end of counting of a predetermined ON timer value. (that is, a second time period).

In step Sa7, the control section 12 stands by for time-out of the ON timer. Thus, the state (hereinafter referred to as "sleep state"), in which the BT baseband section 9 executes neither Inquiry/Page_Scan nor Inquiry/Page, continues after the time-out of the OFF timer until the end of passage of a time period corresponding to the ON timer value.

Upon time-out of the ON timer, the control section 12 advances from step Sa7 to step Sa8. In step Sa8, the control section 12 instructs the BT baseband section 9 to start Inquiry/Page, and activates a call timer. The call timer, for example, can be realized by clocking according to another task process by the control section 12. Alternatively, the call timer may be realized by using a clock circuit. The call timer times out at the end of counting of a predetermined call timer value (that is, a third time period).

Upon receiving the instruction from the control section 12, the BT baseband section 9 starts Inquiry/Page. If a connectable device is be detected by the Inquiry/Page, the BT baseband section 9 informs the control section 12 of the detection of the connectable device. In this state, the present wireless communication apparatus acts as the master of the Bluetooth communication.

In step Sa9 and step Sa10, the control section 12 determines whether the connectable device is detected, or stands by for time-out of the call timer. If the call timer times out without detection of the connectable device, the control section 12 advances from step Sa10 to step Sa11. In step Sa11, the control section 12 instructs the BT baseband section 9 to halt the Inquiry/Page function, and activates the ON timer. Then, the control section 12 returns to step Sa7 in the standby state. Thus, if the connectable device is not successfully detected by the master operation during the time period corresponding to the call timer value, the control section 12 halts the master operation and returns to the sleep-state.

On the other hand, if the connectable device is detected prior to time-out of the call timer, the control section 12 advances from step Sa9 to step Sa12. In step Sa12, the control section 12 executes Bluetooth connection to the detected connectable device. In a subsequent step Sa13, the control section 12 issues a request for role switch to the connected device. The role switch is a process for changing the master/slave roles of the connected devices, which is stipulated in the Bluetooth standard.

In a step Sa14, the control section 12 confirms whether the request for the role switch is accepted. If the role switch is rejected, the control section 12 advances from step Sa14 to step Sa15. In step Sa15, the control section 12 activates the ON timer. Then, the control section 12 returns to step Sa7 in the standby state. Thus, if the request for the role switch is rejected, the control section 12 halts the master operation and returns to the sleep state. However, if the request for the role switch is accepted, the control section 12 advances from step Sa14 to step Sa16 and passes into a standby operation in a power-save mode.

In the wireless communication apparatus according to this embodiment, the OFF timer value and ON timer value can freely be chosen by the user. Thus, the control section 12 executes a user setting process, as illustrated in FIG. 3, on the basis of the BT communication control program.

Figure 3:
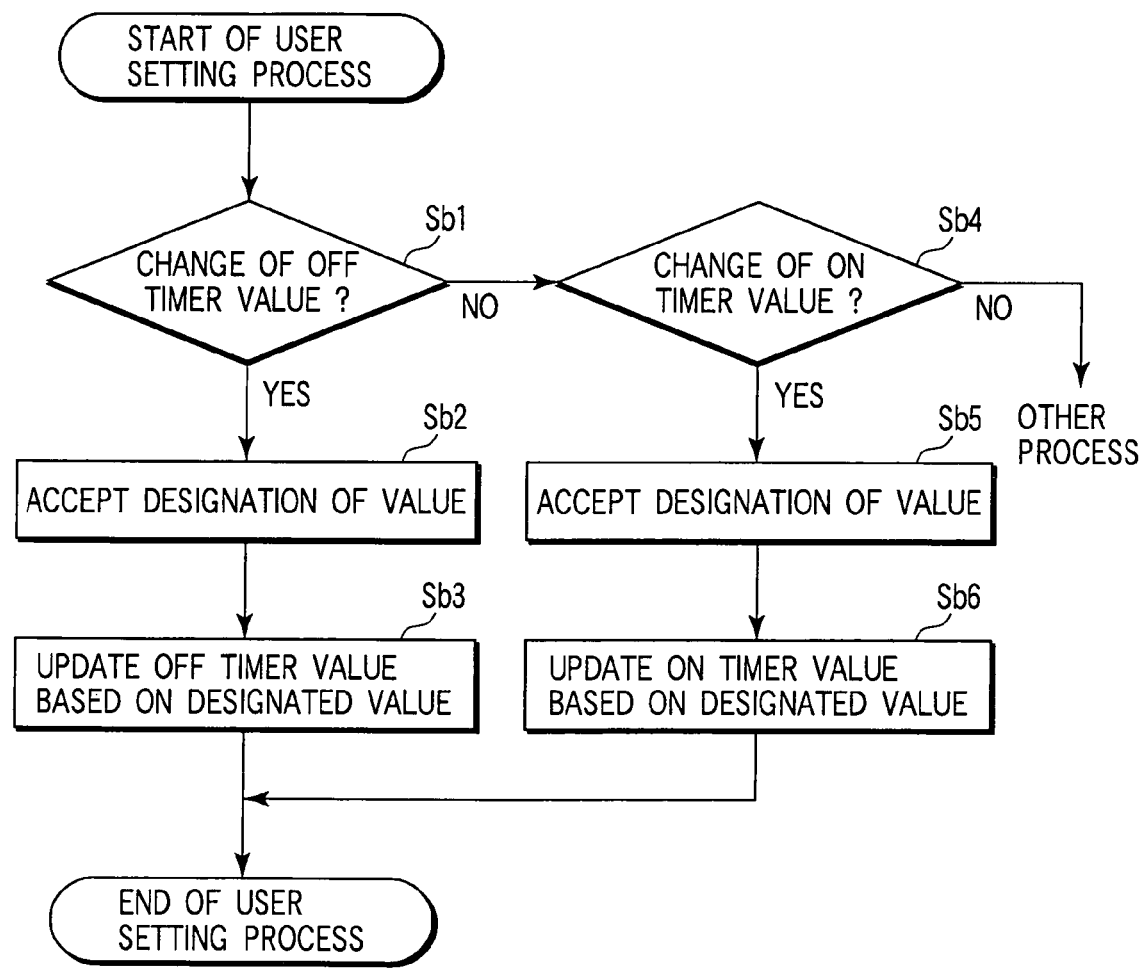
FIG. 3 is a flow chart illustrating procedures of a user setting process by the control section in FIG. 1.

The control section 12 starts the process illustrated in FIG. 3 in response to the user's request for change of settings relating to the Bluetooth communication function. In step Sb1, the control section 12 confirms whether the request for change of setting is directed to a change of the OFF timer value. If the user requests a change of the OFF timer value, the control section 12 advances from step Sb1 to step Sb2. In step Sb2, the control section 12 accepts designation of a value by the user. In a subsequent step Sb3, the control section 12 updates the OFF timer value on the basis of the designated value. Thus, the control section 12 completes the user setting process.

On the other hand, if the user's request is not directed to the change of the OFF timer value, the control section 12 advances from step Sb1 to step Sb4. In step Sb4, the control section 12 confirms whether the request for change of setting is directed to a change of the ON timer value. If the user requests a change of the ON timer value, the control section 12 advances from step Sb4 to step Sb5. In step Sb5, the control section 12 accepts designation of a value by the user. In a subsequent step Sb6, the control section 12 updates the ON timer value on the basis of the designated value. Thus, the control section 12 completes the user setting process.

If the user's request is not directed to the change of the ON timer value, the control section 12 advances to a process (not shown) for changing other settings.

As has been described above, according to the wireless communication apparatus of the present embodiment, if a connectable device is not successfully detected during the time period corresponding to the OFF timer value while the wireless communication apparatus is acting as a slave, the wireless communication apparatus passes into the sleep state in which neither Inquiry/Page_Scan nor Inquiry/Page is executed. It is thus possible to save power consumption, which would be needed if Inquiry/Page_Scan and Inquiry/Page are executed. After the sleep state is continued for the time period corresponding to the ON timer value, the wireless communication apparatus of the present embodiment acts as the master and executes a search for a connectable device by Inquiry/Page. Then, by executing a master/slave role switch with the detected connectable device, the wireless communication apparatus of this embodiment can return to the standby state as the normal slave.

According to the present embodiment, the OFF timer value and ON timer value can be updated by the user's designation. The user can freely set the time period up to the transition to the sleep state and the time period for continuation of the sleep state. Hence, the wireless communication apparatus of this embodiment can operate in a flexible manner according to the user's needs.

Various modifications can be made to the present embodiment, as will be described below.

The present invention is applicable to any communication scheme, other than Bluetooth, if one of a plurality of terminals acts as a master and the other(s) as slave(s).

In the present embodiment, the wireless communication apparatus, which supports W-CDMA and Bluetooth, is used by way of example. The present invention, however, is applicable to a wireless communication apparatus that supports PCD (Personal Digital Cellular) instead of W-CDMA, or to a wireless communication apparatus that is dedicated to Bluetooth.

The OFF timer value and ON timer value may be fixed. Even in the case where the OFF timer value and ON timer value are made variable, it is possible to prepare a plurality of OFF timer values and a plurality of ON timer values in association with a plurality of modes, and to use the OFF timer value and ON timer value corresponding to the selected mode.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A communication apparatus for use as a terminal in a communication network including a plurality of terminals, wherein one of the plurality of terminals acts as a master and at least one other one of the plurality of terminals acts as a slave to execute communication between the terminals, the communication apparatus comprising:
    detection means for detecting a first signal that is sent from the terminal acting as the master;
    halt means for halting the detection means upon non-detection of the first signal during a first time period;
    transmission means for transmitting a second signal in order to inquiry or page the terminals;
    start means for causing the transmission means to start transmission of the second signal, upon passage of a second time period from the halt of the detection means;
    request means for issuing a request for a master/slave role switch to a given one of the terminals that responds to the second signal transmitted by the transmission means; and
    switch means for executing the master/slave role switch upon acceptance of the request.

2. The communication apparatus according to claim 1, further comprising:
    stop means for halting the transmission means upon absence of a response to the second signal within a third time period from the start of the transmission of the second signal by the transmission means; and
    re-start means for causing the transmission means to again start transmission of the second signal, upon passage of the second time period from the halt of the transmission means.

3. The communication apparatus according to claim 1, further comprising:
    stop means for halting the transmission means upon rejection of the request; and re-start means for causing the transmission means to again start transmission of the second signal, upon passage of the second time period from the halt of the transmission means.

4. The communication apparatus according to claim 1, wherein said first time period is designated by a user.

5. The communication apparatus according to claim 1, wherein said second time period is designated by a user.

6. A communication apparatus for use as a terminal in a communication network including a plurality of terminals, wherein one of the plurality of terminals acts as a master and at least one other one of the plurality of terminals acts as a slave to execute communication between the terminals, the communication apparatus comprising:
   a detection unit configured to detect a first signal that is sent from the terminal acting as the master;
   a halt unit configured to halt the detection unit upon non-detection of the first signal during a first time period;
   a transmission unit configured to transmit a second signal in order to inquiry or page the terminals;
   a start unit configured to cause the transmission unit to start transmission of the second signal, upon passage of a second time period from the halt of the detection unit;
   a request unit configured to issue a request for a master/slave role switch to a given one of the terminals that responds to the second signal transmitted by the transmission unit; and
   a switch unit configured to execute the master/slave role switch upon acceptance of the request.

7. The communication apparatus according to claim 6, further comprising:
   a stop unit configured to halt the transmission unit upon absence of a response to the second signal within a third time period from the start of the transmission of the second signal by the transmission unit; and
   a re-start unit configured to cause the transmission unit to again start transmission of the second signal, upon passage of the second time period from the halt of the transmission unit.

8. The communication apparatus according to claim 6, further comprising:
   a stop unit configured to halt the transmission unit upon rejection of the request; and
   a re-start unit configured to cause the transmission unit to again start transmission of the second signal, upon passage of the second time period from the halt of the transmission unit.

9. The communication apparatus according to claim 6, wherein said first time period is designated by a user.

10. The communication apparatus according to claim 6, wherein said second time period is designated by a user.

* * * * *